Aug. 1, 1967 J. A. HERRMANN ETAL 3,334,319
ELECTRO-MAGNETIC CONTACTOR
Filed Aug. 20, 1965
8 Sheets-Sheet 1

INVENTORS.
JOHN A. HERRMANN
FRANK W. KUSSY
R. RICHARD FREDE
BERNARD DI MARCO
BY
OSTROLENK, FABER, GERBE SOFFEN
ATTORNEYS

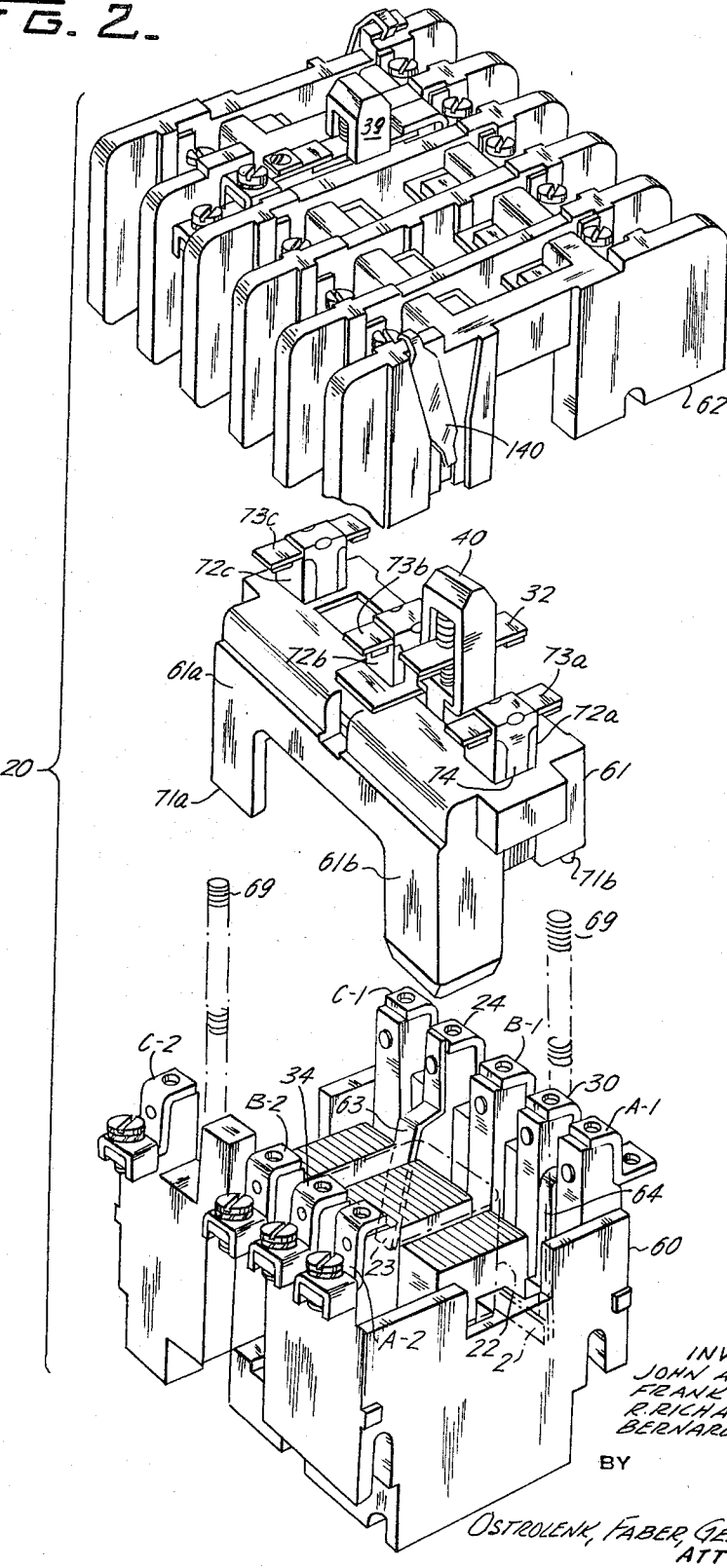

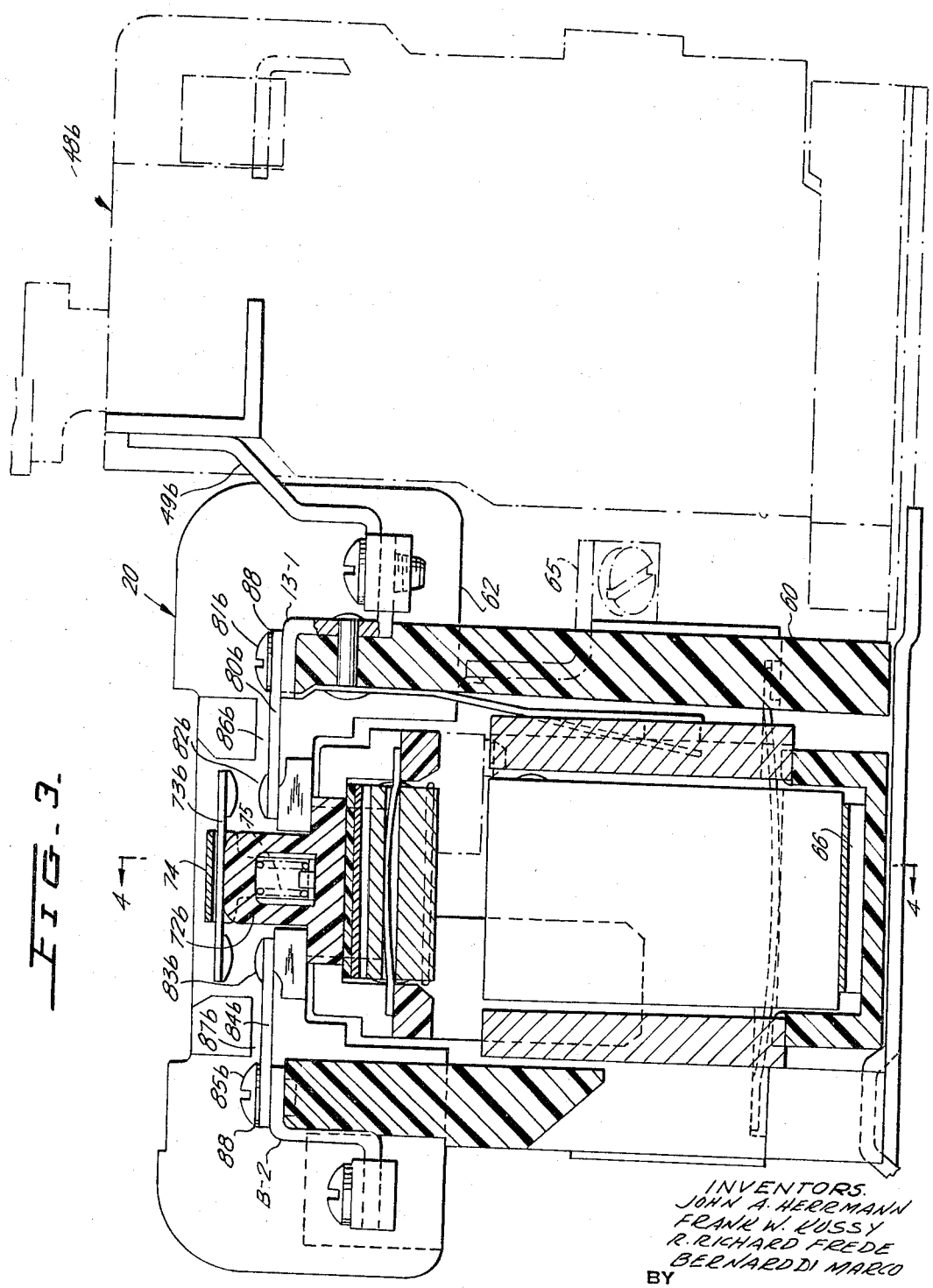

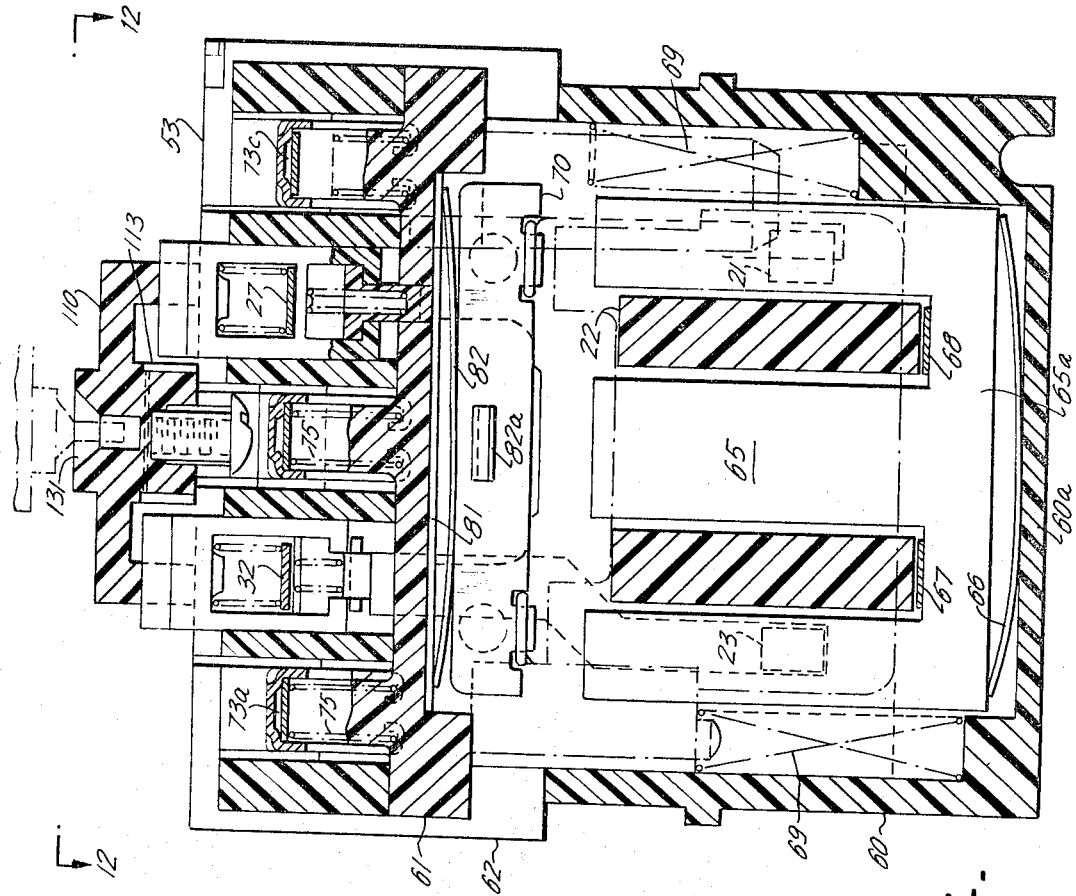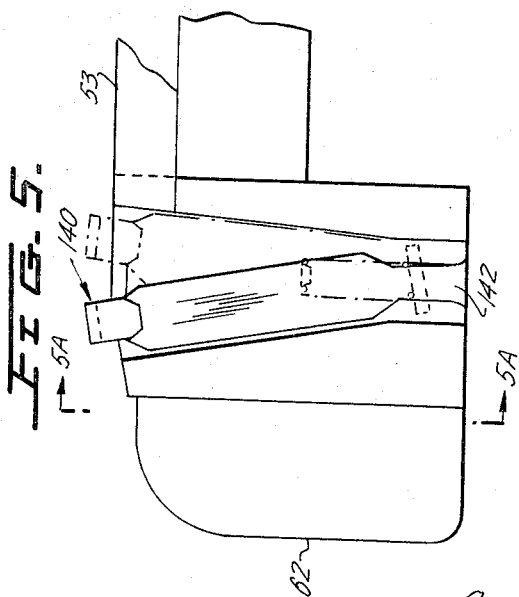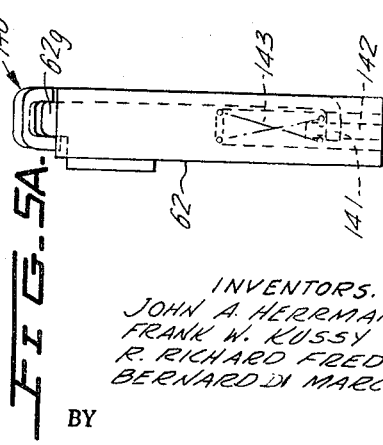

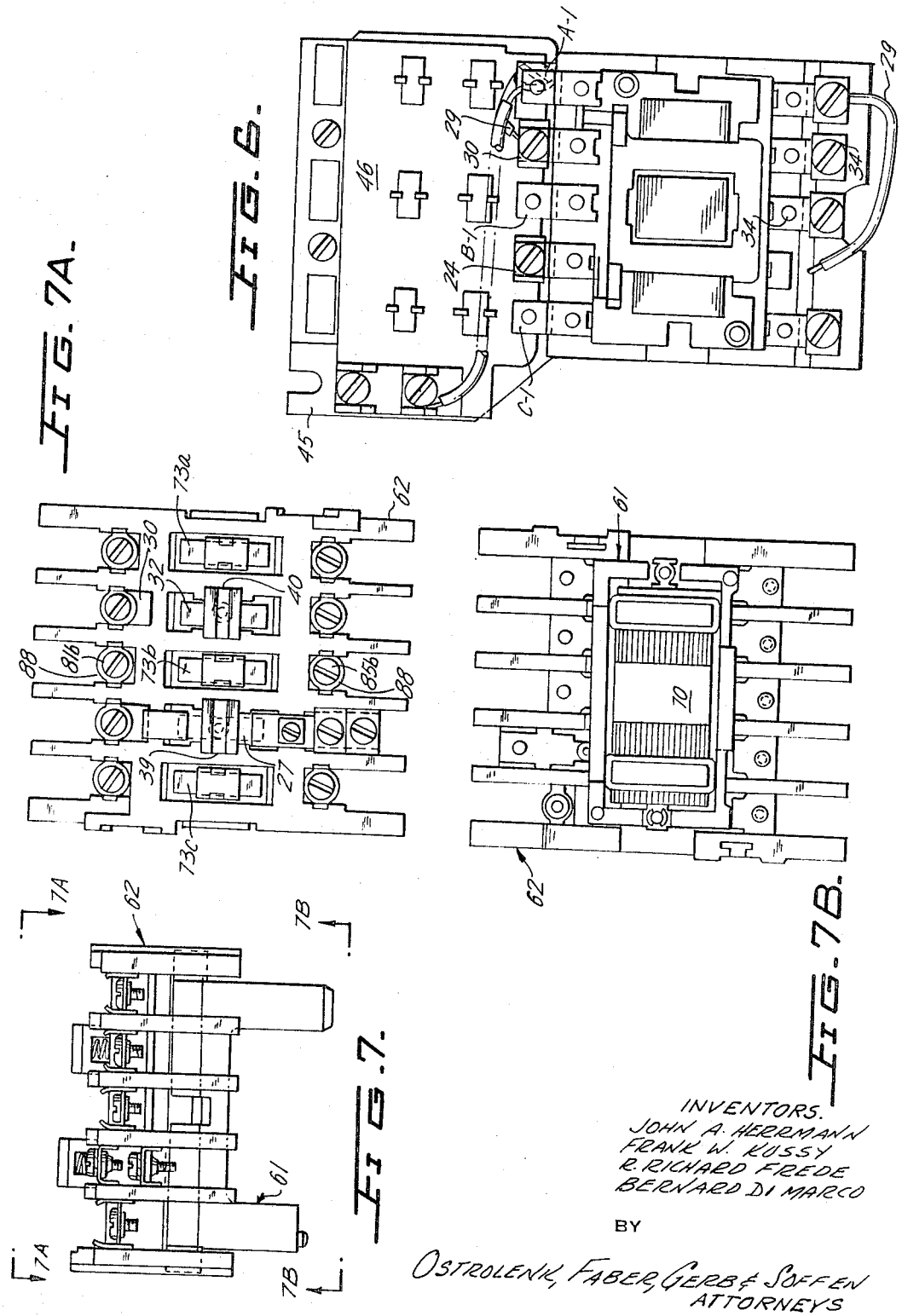

Aug. 1, 1967  J. A. HERRMANN ETAL  3,334,319
ELECTRO-MAGNETIC CONTACTOR
Filed Aug. 20, 1965  8 Sheets-Sheet 6

INVENTORS
JOHN A. HERRMANN
FRANK W. KUSSY
R. RICHARD FREDE
BERNARD DI MARCO

BY

OSTROLENK, FABER, GERB & SOFFEN
ATTORNEYS

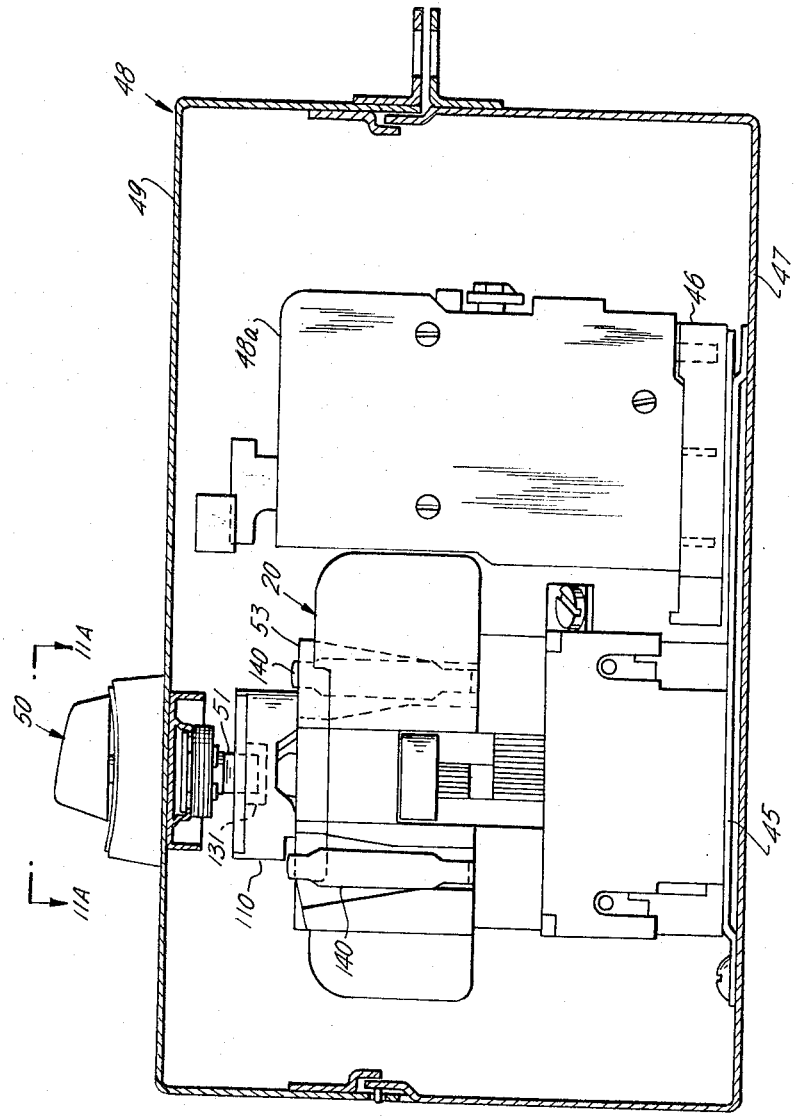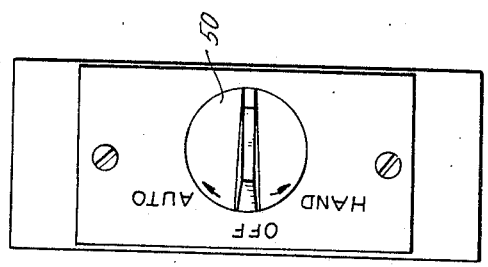

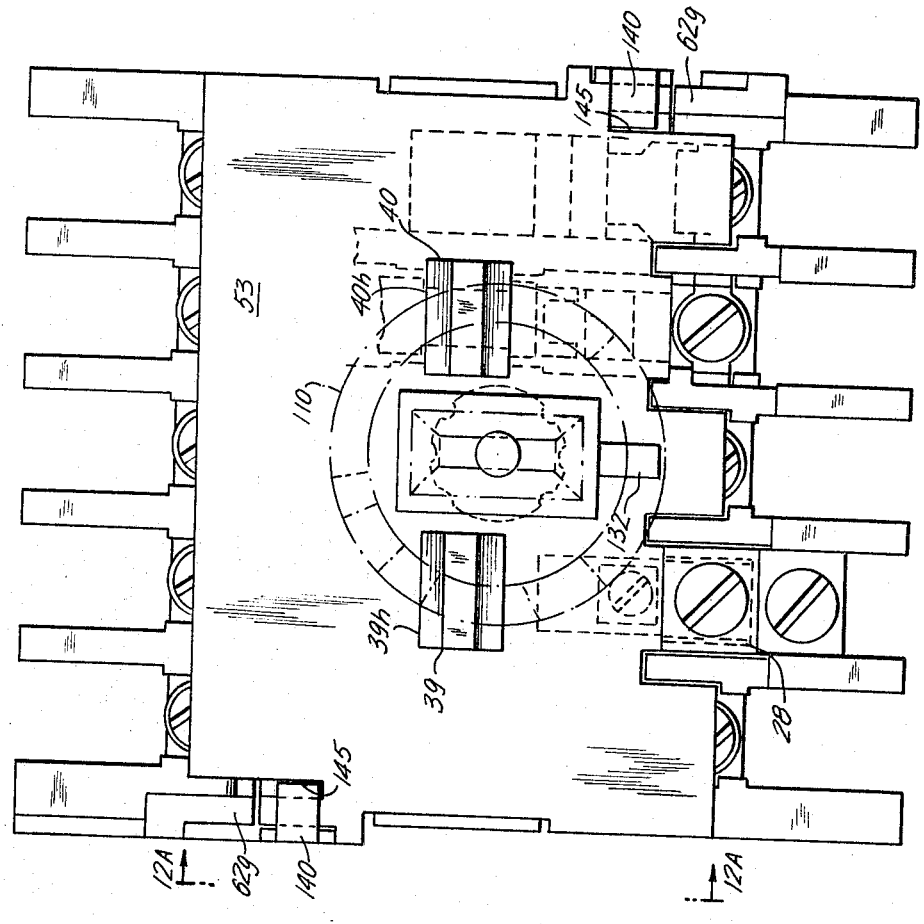

United States Patent Office 3,334,319
Patented Aug. 1, 1967

3,334,319
ELECTRO-MAGNETIC CONTACTOR
John A. Herrmann, Grosse Pointe Farms, Frank W. Kussy, Birmingham, Ralph R. Frede, Grosse Pointe Woods, and Bernard Di Marco, Lincoln Park, Mich., assignors to I-T-E Circuit Breaker Company, Philadelphia, Pa., a corporation of Pennsylvania
Filed Aug. 20, 1965, Ser. No. 481,236
5 Claims. (Cl. 335—131)

This invention relates to electromagnetic contactors in general and more particularly relates to a compact unitary construction for a contactor in combination with control interlock switches.

In electromagnetic contactors of intermediate and low current rates it has been customary to provide a separate interlock unit for control of the electromagnet. Quite often a mechanical connection is made between the interlock and contactor so that when the contactor is closed the normally open starting contacts of the interlock are maintained closed after the start control button is released. Such an arrangement is shown in the Cataldo et al. copending application Ser. No. 189,915, filed Apr. 24. 1962, entitled "Electrical Device" and assigned to the assignee of the instant invention.

As set forth in detail in the Cataldo et al. U.S. Patent No. 3,210,488 issued Oct. 5, 1965, entitled "Switching Device" and assigned to the assignee of the instant invention, it is often desirable to control the interlock for selective operation to achieve different modes of operation. That is, the interlock typically includes a set of normally open start contacts and a set of normally closed stop contacts. A typical selector is operable to three different positions, namely Auto, Off and Hand. In the "Auto" position the normally open contacts remain open and the normally closed contacts remain closed, in the "Off" position the normally open contacts remain open and the normally closed contacts are operated to their open position, while in the "Hand" position the normally open contacts are closed and the normally closed contacts are also closed.

It is a primary object of the instant invention to provide a novel construction for an integrated electromagnetic contactor interlock unit which may readily be provided with a selector switch. This is accomplished by providing a housing having five parallel contact compartments with the outer compartments and the center compartment each having the main contacts of a different phase while the remaining compartments contain the switch elements of the control switches constituting the interlock.

All of the removable switch elements are mounted to a movable contact carrier which also supports the manual control members for operating the control switches. These control members project through apertures in an insulating cover of the contactor so as to be accessible for operation when the main and control contacts are covered. The control members are mounted for movement relative to the movable contact carrier with the connection for the control member of the normally open switch being such that when the electromagnet is actuated the normally open switch of the interlock is maintained closed even when the control member for this switch is released.

It is a simple matter to add a selector switch to the unit without the necessity of altering or adding any electrical wiring. One such selector switch is a rotatable selector element operable between three positions to actuate the control switches in predetermined combinations.

As will hereinafter become obvious, a contactor constructed in accordance with the instant invention will be relatively inexpensive particularly in view of the simplicity of the assembly. Further, it is a simple matter to change the contacts in that all of the movable contacts as well as the main stationary contacts may be changed without disturbing any wiring.

Accordingly, another object of the instant invention is to provide a novel construction for a combination contactor selector switch of relatively low current rating in which the main terminals are spaced apart by a distance substantially equal to the spacing between the main contacts of a contactor in the intermediate current range so that standard overload relays may be utilized.

Still another object is to provide a novel contactor construction in which the switches constituting the main interlock are positioned between and extend parallel to the conducting elements for the phases being controlled by the contactor.

A further object is to provide a contactor of this type in which the control members of the interlock extend through apertures in the cover for the main contacts so as to be accessible for operation of the interlock.

A still further object is to provide a contactor of this type having novel means for selecting the mode of operation thereof with this means being constructed so that installation thereof may be made without disturbing wiring connections to the contactor.

These as well as other objects of the instant invention will become readily apparent after reading the description of the accompanying drawings in which:

FIGURE 2 is an exploded perspective showing the relationship between the main elements of the contactor.

FIGURE 3 is a cross-section of the contactor through the center phase thereof along line 3—3 of FIGURE 1 looking in the direction of arrows 3—3.

FIGURE 4 is a cross-section taken through line 4—4 of FIGURE 3 looking in the direction of arrow 4—4.

FIGURE 5 is a fragmentary side elevation showing the operation of one of the retaining elements for the contactor cover.

FIGURE 5A is an end view of the retaining element of FIGURE 5 looking in the direction of arrow 5A—5A of FIGURE 5.

FIGURE 6 is a plan view showing the contactor base and the overload relay plug-in base secured to a mounting plate.

FIGURE 7 is an end view of the movable and stationary contact carriers mounted to one another.

FIGURES 7A and 7B are a front and back elevation, respectively, of the elements shown in FIGURE 7 looking in the directions of arrows 7A, 7A and 7B, 7B, respectively.

FIGURE 8 is a side elevation of the elements constituting the normally closed switch of the interlock.

FIGURE 9 is a side elevation showing the elements of the normally open switch of the interlock.

FIGURE 9A is an end view of the elements of FIGURE 9 looking in the direction of arrows 9A, 9A, of FIGURE 9.

FIGURE 11 is a side elevation showing the contactor and overload relays mounted within an enclosure having an openable cover carrying an external handle for operating a selector device mounted to the contactor cover.

FIGURE 11A is a fragmentary plan view looking in the direction of arrows 11A, 11A of FIGURE 11 and illustrating the cover mounted operating handle for the selector device.

FIGURE 12 is a plan view of the contactor looking in the direction of arrows 12, 12 of FIGURE 4.

FIGURE 12A is a side elevation of the contactor cover looking in the direction of arrows 12A, 12A of FIGURE 12.

Figure 10:
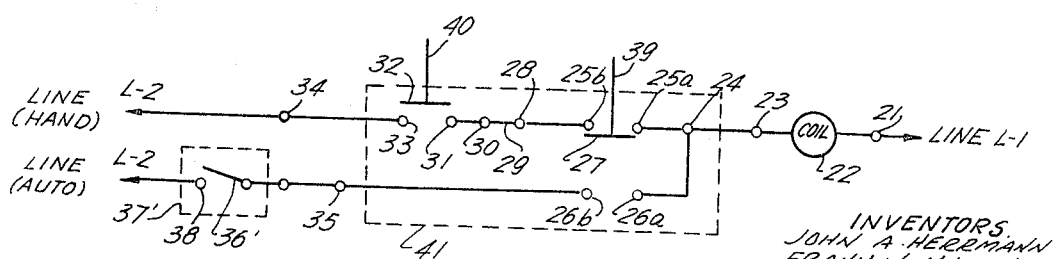
FIGURE 10 is an electrical schematic showing the hookup between the switches of the interlock and the operating coil of the electromagnet.

Now referring to the figures and more particularly to FIGURE 10 which illustrates the wiring diagram for electromagnetic contactor 20. One of the contacts 21 of magnet coil 22 is connected to line L–1 in a manner to be hereinafter explained. The other coil terminal 23 is connected directly to stop control terminal 24 with the latter being connected directly to a pair of spaced contacts 25a, 26a. In a manner to be hereinafter explained movable bridging contact 27 is normally biased into engagement with contacts 25a, 25b and is operable out of engagement with these contacts into engagement with contacts 26a, 26b. Contact 25b is mounted to one end of terminal 28 having its other end connected through insulation covered wire 29 to terminal 30 mounting stationary contact 31.

Movable contact 32, which is biased out of engagement with contact 31, is operable into engagement with contacts 31 and 33. The latter is mounted to and connected through terminal 34 to the other side of line L–2. Terminal 26b is connected through insulation covered conductor 35 to movable contact 36' of automatic device 37'. The latter is illustrated as being a single pole switch having its stationary contact 38 connected to the other line L–2. As will hereinafter be explained, push button actuators 39, 40 are connected to bridging contacts 27, 32, respectively, for manual operation of these contacts. It is noted that conductor 35 and automatic device 37' are illustrated only in FIGURE 10 and that the elements enclosed within dashed rectangle 41 perform the same electrical functions as those performed by the holding interlock of the electro magnetic motor starter described in detail in the aforesaid copending application Ser. No. 189,915.

Figure 1:
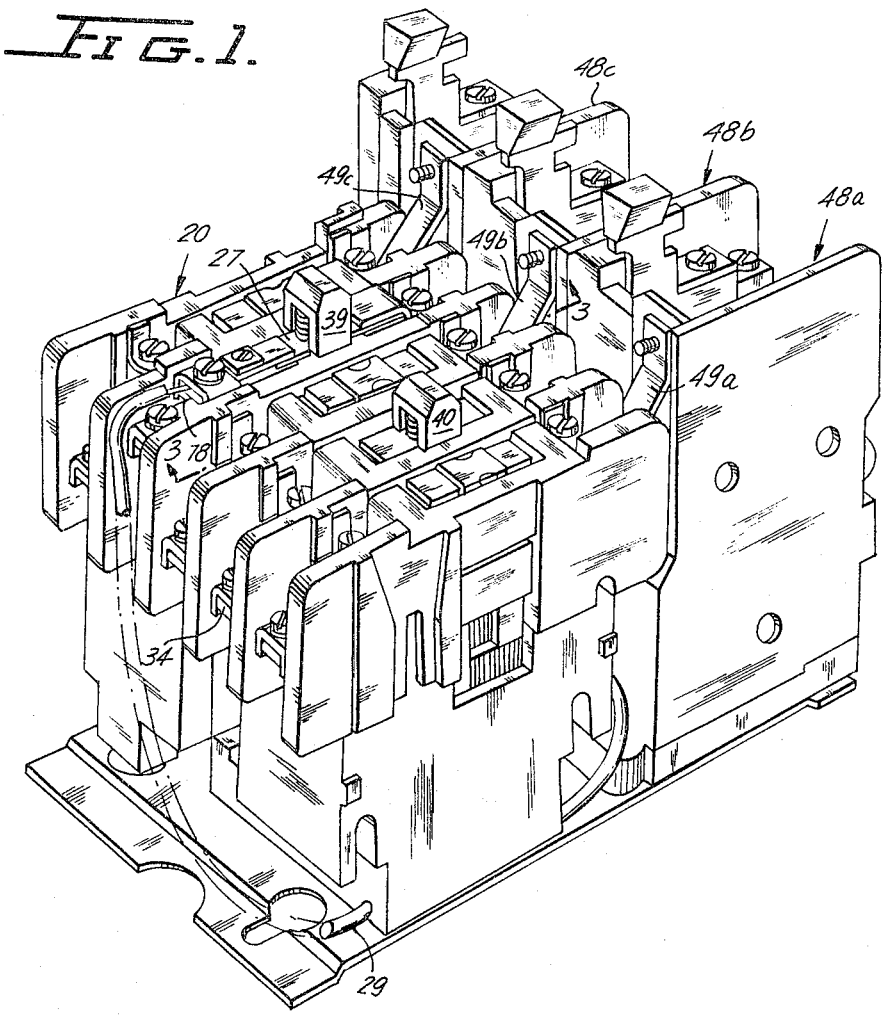
FIGURE 1 is a perspective illustrating a contactor constructed according to the instant invention, with the cover thereof removed, mounted to a plate also having three overload relays mounted thereto.

As best seen in FIGURES 1 and 11, contactor 20 is secured to one end of mounting plate 45 having plug-in base 46 mounted at the other end thereof. Mounting plate 45 is secured to the back wall 47 of enclosure 48 having removable front cover 49. Three overload relays 48a, 48b, 48c are mounted to plug-in base 46 and are electrically connected to contactor terminals A–1, B–1, C–1 by means of conducting straps 49a, 49b, 49c respectively. The mounting of overload relays to a plug-in base and their electrical connection to a contactor is explained in detail in the U.S. Patent No. 3,213,407 issued Oct. 19, 1965, entitled "Plug-In Base" with R. W. Thomas et al. as inventors and assigned to the assignee of the instant invention.

Selector switch operating handle 50, mounted to the outside of cover 49, is effective by virtue of internal extension 51 thereof to operate selector switch control 110 mounted to the contact cover 53 of contactor 20. As best seen in FIGURE 2, contactor 20 includes three main insulating members, namely, base 60, movable contact carrier 61 and stationary contact carrier 62. Main current load terminals A–1, B–1, C–1 are fixedly secured by rivets to base 60 in spaced relation with respect to main line terminals A–2, B–2, C–2. Also fixedly mounted to base 60 are control terminals 24, 30 and 34. Control terminal 30 is positioned between main terminals A–1 and B–1, control terminal 34 is positioned between main terminals A–2 and B–2.

The rivet securing terminal 24 to base 60 also secures spring finger 63 in operative position to engage magnet coil terminal 23. Another spring finger 64, mounted to base 60 in electrical engagement with one end of terminal 65 (FIGURE 3), is positioned for engagement with the other terminal 21 of magnet coil 22. E-shaped magnet yoke 65 is mounted to base 60 with the yoke arms facing forwardly or toward the open end of the central cavity in base 60 and coil 22 surrounding the central arm.

Leaf spring 66 (FIGURE 4) resting against the rear wall 60a of base 60 engages the rear of yoke 65. Two additional leaf springs 67, 68, each extending transverse to spring 66 and having its ends captured in suitable internal depressions of base 60, engage the forward surface of the magnet yoke leg 65a and secure yoke 65 to base 60. The cooperation of springs 66, 67 and 68 provides a so-called two way cushion for yoke 65 and provides the sole means securing yoke 65 to base 60. It is noted that magnet coil 22 is seated against internal formations of base 60 rather than being seated upon yoke 65 so that only minimal shock caused by engagement of magnet armature 70 will be transmitted to coil 22.

Also captured in base 60 are contact return springs 69 whose rear ends are entered into apertures in, and bear against, base 60 with the forward ends of springs 69 encircling rear projections 71a, 71b of movable contact carrier 61 so as to bias the latter in a forward direction with respect to base 60. Turns at the rear end of each spring 69 are enlarged so that they frictionally engage the walls of the base recesses to secure springs 69 to base 60. Guidance for movement of carrier 61 relative to base 60 is provided by rearward projections 61a, 61b of carrier 61 with each of these latter projections being of generally L-shaped cross section and cooperating with suitable complementary internal formations of base 60. Relatively flat magnet armature 70 is attracted to yoke 65 when coil 22 is energized. Spring 82a (FIGURE 4) extends through a transverse aperture in armature 70 with the ends of spring 82a being captured by internal formations of carrier 61 to secure armature 70 to carrier 61. Leaf spring 82, extending transverse to spring 82a, is interposed between the forward surface of armature 70 and fibre sheet 81 with springs 82, 82a providing cushioning for armature 70.

Extending forwardly from carrier 61 are three hollow posts 72a, 72b, 72c. Individual bridging contacts 73a, 73b, and 73c are mounted to the forward ends of posts 72a, 72b, and 72c, respectively, with each of these bridging contacts being held in place by an individual inverted U-shaped retainer 74. The latter is biased to the rear by an individual compression spring 75 (see FIGURE 4) which engages the forward end of the respective posts 72a, 72b, 72c and the inturned formations at the free ends of the retainer arms.

Also mounted to movable contact carrier 61 is bridging control contact 32. That is, contact 32 extends through central aperture 40a in push button control 40. As best seen in FIGURE 9, compression spring 76 disposed in the forward section of aperture 40a biases contact 32 against the transverse partition 40b of control 40. Another compression spring 77, disposed within the rear portion of aperture 40a, bears against the forward surface of guide member 78 thereby biasing control member 40 in the forward direction with respect to movable contact carrier 61. Member 78 is captured to carrier 61 by virtue of extensions 79, 79 and insulating sheet 81 which is biased in the forward direction by leaf-spring 82 bearing against the rear surface of armature 70 (see FIGURE 4).

Forward movement of control 40 with respect to member 78 is limited through the engagement of inturned formations 40c of member 40 and outward projections 78a of member 78. Initial rearward movement of push button member 40 compresses spring 77 until such time as bridging contact 32 engages spaced contacts 31, 33 after which spring 76 becomes compressed. Upon rearward movement of contact carrier 61 projections 78 move to the rear and prevent forward movement of member 40 so that bridging contact 32 remains in engagement with spaced contacts 31, 33.

The main current path through the center phase extends from load terminal B–1 to terminal strap 80b secured at one of its ends to terminal B–1 by screw 81b and having main stationary contact 82b at its other end, bridging contact 73b, and stationary main contact 83b mounted to one end of terminal strap 84b whose other end is secured by screw 85b to line terminal B-2. Since the current path between terminals A-1, A-2 and C-1, C-2 are each identical to the current path between terminals B-1 and B-2 no further description thereof will be given.

Straps 80b and 84b extend through slots 86b, 87b in stationary contact carrier 62 so that by merely removing screws 81b and 85b stationary contacts 82b, 83b may be changed without disturbing any external wiring to contactor 20. U-shaped clips 88 are provided for retaining screws 81b and 85b to stationary contact carrier 62. The construction and function of clips 88 is explained in detail in the U.S. Patent No. 3,213,255 issued Oct. 19, 1965, entitled "Stationary Contact Combination," with Kussy et al. as inventors, and assigned to the assignee of the instant invention.

It is noted that screws 81b, 85b as well as similar screws of the other phases provide the mechanical securement of stationary contact carrier 62 to base 60. Further, it is evident from the drawings that contact carrier 62 provides suitable formations constituting barriers between the current carrying elements of the different phases as well as control circuits. In addition carrier 62 is provided with suitable apertures for the passage of posts 72a, 72b and 73b as well as control members 39, 40.

As best seen in FIGURE 8 control terminal strap 28 is mounted to the forward end of stationary contact carrier formation 62f by means of flat head screw 91 whose head rests upon insulating member 92. The threaded stem of screw 91 extends through insulating sleeve 93. Member 92 rests against the forward surface of strap 98 while sleeve 93 extends through clearance apertures in strap 28 and carrier formations 62f. The stem of screw 91 extends through a clearance aperture in control terminal strap 94 and is engaged by retaining nut 95. Terminal strap 94 rests against the rear surface of formation 62f and at one of its ends mounts stationary terminal 26b and at the other end mounts a wire grip 94a.

Terminal strap 96 which mounts stationary contact 26a is similar in construction to terminal strap 80b (FIGURE 3) and is mounted in substantially the same manner. Terminal 25a is mounted to one end of offset strap 97 whose other end rests against the forward surface of strap 96. Screw 98 mechanically secures straps 96, 97 to stationary contact carrier 62 in electrical engagement with control terminal 24.

Push button control member 39 is of substantially the same size and construction as push button control member 40. The former is biased in a forward direction by means of coiled compression spring 101 mounted in the central recess of generally U-shaped spring retainer 102 having outwardly extending ears disposed in positioning notches in the forward surface of carrier 62. With bridging contact 27 in its normal position shown in FIGURE 8 spring 101 biases member 39 upwardly so that bridging contact 27 is in engagement with stationary contacts 25a, 26b. Spring 104 in the upper portion of the central recess in member 39 biases bridging contact 27 to the rear with the latter being seated against the forward surface of partition 105 except when bridging contact 27 is operated into engagement with stationary contacts 26a, 26b. During the latter operation spring 104 is compressible to accommodate overtravel of member 39. Bridging contact 27 engages contacts 26a, 26b as the result of direct manual or selector switch operation of member 39. Aligned apertures 103a, 103b, in contact carriers 61, 62, respectively, serve to position and guide movement of control member 39.

In the most simple type of operation for contactor 20 member 40 is a Start control since upon being depressed it closes a circuit between operating coil 22 and line L-2. This energizes the contactor magnet causing movable contact carrier 61 to move rearwardly and, as previously explained, in this position of contact carrier 61 bridging contact 32 remains in engagement with stationary contacts 31, 33 even if member 40 is released. Member 39 then acts as a Stop control in that when it is depressed bridging contact 27 breaks engagement with stationary contacts 25a, 25b thereby interrupting the energizing circuit for coil 22. This permits contact carrier 61 to move forward under the influence of return springs 69, 69.

Cover 53 is mounted to stationary contact carrier 62 by means of two identical spring loaded latch elements 140. As best seen in FIGURES 5 and 5A, element 140 is an elongated member whose forward end is inwardly hooked so that stationary contact carrier formation 62g guides pivotal movement of member 140. The rear end of member 140 is bent inwardly and is formed with T configuration 141 which extends into T-shaped slot 142 of stationary contact carrier 62. Compression spring 143, disposed in slot 142, bears against the T thereby urging member 140 to the rear. The solid line illustration of FIGURE 5 shows the release position for member 140 while the dotted illustration shows the latching position. In the latching position the hooked forward end of member 140 extends into cover slot 145 (FIGURE 12) so as to prevent forward movement of cover 53.

Control members 39, 40 extend through apertures 39a, 40a respectively in cover 53 so that these control members may be operated while cover 53 is in position.

Selector member 110 (FIGURE 12A) is pivotally mounted to the front of cover 53 by means of screw 111 and threaded insert 112 which is fixedly mounted to the rearwardly extending central post 113 of member 110 and extends into circular aperture 114 in cover 53. The front surface of cover 53 is provided with a shallow rectangular depression 115 which receives and positions the web of generally U-shaped spring detent member 116. The central portion of the web of member 116 is slotted so as to permit insert 114 to pass therethrough while the arms of member 116 are provided with inward button-like projections 116a which are biased into the axial grooves in the periphery of post 113 to function as a detent means. The skirt portion 119 of selector member 110 is positioned for engagement with push buttons 39, 40 and is formed as a cam so that for selected positions of selector member 110 push button controls 39, 40 will be operated to predetermined positions.

More particularly, selector member 110 is operable to three discrete positions determined by the engagement of detent projections 116a in the axial slots of post 113. In the central position for selector member 110 stop control 39 is operated to a mid-position such that bridging contact 27 is free from engagement with contacts 25a, 25b, 26a, 26b. When member 110 is rotated counterclockwise (when facing the front of cover 53) from the central position the cam formations on skirt 110 permit bridging contact 27 to remain in engagement with stationary contacts 25a, 25b and operate bridging contact 32 into engagement with stationary contacts 31, 33. When selector 110 is operated clockwise from its central position push button control 39 is operated so that bridging contact 27 engages stationary contacts 26a, 26b and contact 32 remains open. Cover projection 132 limits rotation of member 110.

The forward surface of selector member 110 is provided with elongated slot 131 to receive handle extension 51 (FIGURE 11) with slot 131 having a flared opening to facilitate entry of extension 51 as cover 49 is moved into closed position. In the manner explained in detail in the aforesaid copending application 266, 265, knob 50 is biased to a central position with a relatively light spring. Thus, if cover 49 is open and selector member 52 is operated to one of its off center positions, upon subsequent closing of cover 49 the misalignment between the centrally positioned knob 50 and selector control 52 will be little enough to permit the flared opening of slot 131 to turn knob 50 and guide extension 51.

Thus, the instant invention provides a novel compact construction for an integrated electro-magnetic contactor interlock unit. While the embodiment described shows a normally closed and a normally open interlock switches, it should now be apparent to those skilled in the art that it is a simple matter to convert the unit illustrated to a five pole contactor by modifying the normally closed control contact section. This may readily be accomplished by replacing members 39, 102, springs 101, 104 and contact 27 by elements identical to members 40, 78, springs 76, 77 and contact 32. To permit this change, movable contact carrier 61 is provided with recesses 61', 61' positioned to the rear of aperture 103a.

Although there has been described a preferred embodiment of this novel invention, many variations and modifications will now be apparent to those skilled in the art. Therefore, this invention is to be limited, not by the specific disclosure herein, but only by the appending claims.

We claim:
1. An electromagnetic contactor including a first, second and third main contact means; a first and a second control contact means; each of said main and said control contact means including a stationary contact means and an associated movable contact means operable into and out of engagement with its associated stationary contact means; an electromagnet for operating each of the main contact means into one position of its open and closed positions; biasing means urging each of the main contact means into the other position of its open and closed positions; said electromagnet including an energizing winding; conducting elements joining said energizing winding in electrical series with said first and said second control contact means; a movable contact carrier connected to said electromagnet; said movable contact means of said first control contact means and each of said main contact means mounted to said movable contact carrier; said movable contact means of the first control contact means positioned between the movable contact means of said first and said second main contact means; said movable contact means of the second control contact means positioned between the movable contact means of said second and said third main contact means; a first control member for operating said first control contact means and a second control member for operating said second control contact means; means mounting each of said control members for movement relative to said movable contact carrier.

2. A contactor as set forth in claim 1 in which the first control member is movable between a first and a second position; biasing means urging said first control member to said first position; said movable contact carrier operating said first control member to said second position when said winding of said electromagnet is energized.

3. A contactor as set forth in claim 1 in which all of said main and said control contact means are positioned at the front of said movable contact carrier; a cover means for all of said main and said control contact means; said cover means positioned in front of said movable contact carrier; said control members extending through aperture means in said cover means so as to be accessible for operation when said main and said control contact means are protected by said cover means.

4. A contactor as set forth in claim 3 further including a selector device movably mounted to said cover means; said selector device engageable with said control members for operation thereof in predetermined combinations related to positions of said selector device.

5. An electromagnetic contactor including a first, second and third main contact means; a first and a second control contact means; each of said main and said control contact means including a stationary contact means and an associated movable contact means operable into and out of engagement with its associated stationary contact means; an electromagnet for operating each of the main contact means into one position of its open and closed positions; biasing means urging each of the main contact means into the other position of its open and closed positions; a movable contact carrier connected to said electromagnet; said movable contact means of said first control contact means and each of said main contact means mounted to said movable contact carrier; said movable contact means of the first control contact means positioned between the movable contact means of said first and said second main contact means; said movable contact means of the second control contact means positioned between the movable contact means of said second and said third main contact means and remaining stationary when said electromagnet is energized; said second control contact means having a normally open and a normally closed section; said second control contact means being removable and replaceable by a contact means of a construction substantially identical to said first control contact means and having a movable contact means mounted to said movable contact carrier.

References Cited
UNITED STATES PATENTS

| | | | |
|---|---|---|---|
| 2,924,685 | 2/1960 | Burch | 200—16 X |
| 3,099,730 | 7/1963 | Tateishi | 335—131 |
| 3,102,935 | 9/1963 | Christeler | 335—132 |
| 3,215,800 | 11/1965 | Hurter et al. | 335—202 X |

BERNARD A. GILHEANY, *Primary Examiner.*

R. N. ENVALL, JR., *Assistant Examiner.*